United States Patent
Okochi

(10) Patent No.: US 10,199,893 B2
(45) Date of Patent: Feb. 5, 2019

(54) ROTOR OF ROTARY ELECTRIC MACHINE

(71) Applicant: TOYOTA JIDOSHA KABUSHIKI KAISHA, Toyota-shi, Aichi-ken (JP)

(72) Inventor: Toshinori Okochi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 175 days.

(21) Appl. No.: 15/180,538

(22) Filed: Jun. 13, 2016

(65) Prior Publication Data
US 2016/0372983 A1 Dec. 22, 2016

(30) Foreign Application Priority Data
Jun. 16, 2015 (JP) ................................. 2015-121081

(51) Int. Cl.
| | | |
|---|---|---|
| *H02K 1/22* | (2006.01) | |
| *H02K 1/32* | (2006.01) | |
| *H02K 9/19* | (2006.01) | |
| *H02K 1/27* | (2006.01) | |

(52) U.S. Cl.
CPC .............. *H02K 1/32* (2013.01); *H02K 1/2766* (2013.01); *H02K 9/19* (2013.01)

(58) Field of Classification Search
CPC ............ H02K 1/32; H02K 9/197; H02K 9/19; H02K 5/1737; H02K 7/086; H02K 7/088; H02K 1/27; H02K 1/2766; H02K 1/22
USPC ...................................... 310/60 A, 61, 52–64
See application file for complete search history.

(56) References Cited

U.S. PATENT DOCUMENTS

| | | | | |
|---|---|---|---|---|
| 3,684,906 | A * | 8/1972 | Lenz ...................... | H02K 1/32 310/61 |
| 4,301,386 | A * | 11/1981 | Schweder ................ | H02K 1/32 310/211 |
| 4,341,966 | A * | 7/1982 | Pangburn ............... | H02K 17/16 310/61 |
| 4,365,178 | A * | 12/1982 | Lenz ...................... | H02K 1/32 310/216.053 |
| 4,395,816 | A * | 8/1983 | Pangburn ................ | H02K 1/32 164/DIG. 10 |
| 4,499,660 | A * | 2/1985 | Lenz ...................... | H02K 1/32 164/109 |
| 6,727,609 | B2 * | 4/2004 | Johnsen .................. | H02K 1/32 310/52 |

(Continued)

FOREIGN PATENT DOCUMENTS

| | | | |
|---|---|---|---|
| JP | 2006-067777 | A | 3/2006 |
| JP | 2006067777 | A * | 3/2006 |

(Continued)

*Primary Examiner* — Naishadh Desai
(74) *Attorney, Agent, or Firm* — Sughrue Mion, PLLC

(57) ABSTRACT

A rotor of a rotary electric machine, which is supported by a rotating shaft, includes a rotor core, and a permanent magnet embedded in the rotor core. At least one in-core cooling medium passage that leads a cooling medium supplied from an in-shaft cooling medium passage formed inside the rotating shaft to an outer peripheral end of the rotor core, and discharges the supplied cooling medium into a gap between the rotor core and a stator, is formed in the rotor core. The at least one in-core cooling medium passage includes a center cooling medium passage, a pair of inner peripheral side cooling medium passages, and an outer peripheral side cooling medium passage that is communicated with the gap. A radially outside end portion of the center cooling medium passage has a slope that extends toward a radially outer side closer to a center in the axial direction.

5 Claims, 8 Drawing Sheets

(56) References Cited

U.S. PATENT DOCUMENTS

| | | | | |
|---|---|---|---|---|
| 8,847,445 B2* | 9/2014 | Kowalski | ............... | H02K 1/32 310/58 |
| 2006/0071568 A1* | 4/2006 | Kimura | ............... | H02K 1/2706 310/156.56 |
| 2010/0194220 A1* | 8/2010 | Tatematsu | ............ | H02K 1/2766 310/61 |
| 2010/0237725 A1* | 9/2010 | Tatematsu | ............... | H02K 1/32 310/61 |
| 2012/0248906 A1* | 10/2012 | Hayslett | ............... | H02K 1/2766 310/61 |
| 2013/0221772 A1* | 8/2013 | Miyamoto | ............... | H02K 9/19 310/54 |
| 2014/0175916 A1* | 6/2014 | Chamberlin | ............ | H02K 9/19 310/54 |
| 2016/0036276 A1 | 2/2016 | Yamagishi et al. | | |

FOREIGN PATENT DOCUMENTS

| | | | | |
|---|---|---|---|---|
| JP | 2008-219960 A | 9/2008 | | |
| JP | 2008-228522 A | 9/2008 | | |
| JP | WO 2011132784 A1 * | 10/2011 | ............... | H02K 1/32 |
| JP | 2012-223075 A | 11/2012 | | |
| JP | 2013-55775 A | 3/2013 | | |
| JP | 2014-50219 A | 3/2014 | | |
| JP | 2014-176235 A | 9/2014 | | |
| JP | 2014-230408 A | 12/2014 | | |
| JP | 2015-89316 A | 5/2015 | | |
| JP | 2015089316 A * | 5/2015 | | |
| JP | 2016-012979 A | 1/2016 | | |
| JP | 2016-054608 A | 4/2016 | | |
| WO | 2012/080566 A1 | 6/2012 | | |
| WO | 2015/198118 A1 | 12/2015 | | |

* cited by examiner

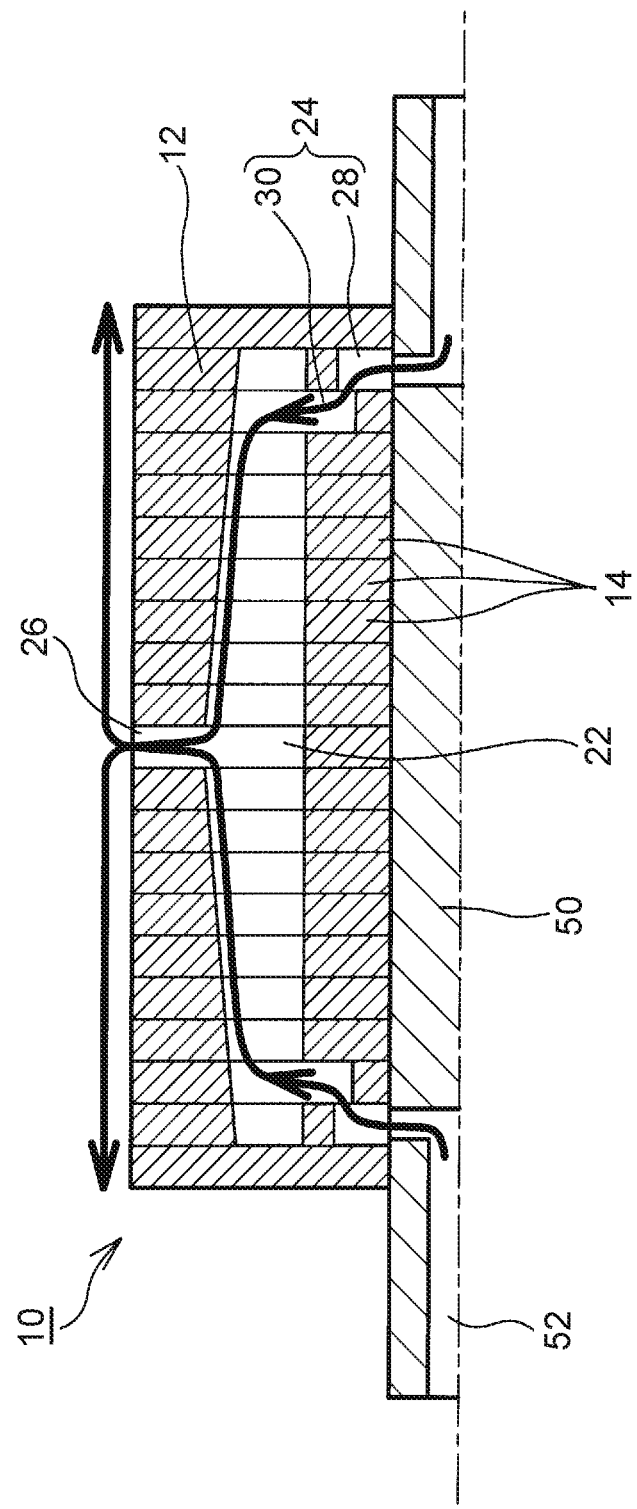

ROTOR OF ROTARY ELECTRIC MACHINE

INCORPORATION BY REFERENCE

The disclosure of Japanese Patent Application No. 2015-121081 filed on Jun. 16, 2015 including the specification, drawings and abstract is incorporated herein by reference in its entirety.

BACKGROUND OF THE INVENTION

1. Field of the Invention

The invention relates to a rotor of a rotary electric machine, which includes a rotor core, and permanent magnets embedded near an outer periphery of the rotor core.

2. Description of Related Art

In a permanent magnet synchronous rotary electric machine in which permanent magnets are embedded inside of a rotor core, when a temperature of a rotor increases as the rotary electric machine is driven, not only does the magnetic performance decrease causing a reduction in torque and efficiency, but the permanent magnets will demagnetize when the temperature becomes high. When magnets having high coercive force are employed, the problem of demagnetization is able to be avoided, but in this case, the content percentage of heavy rare earth must be increased, which leads to a cost increase.

Therefore, various structures of the related art have been proposed to a cool rotary electric machine. For example, Japanese Patent Application Publication No. 2008-228522 (JP 2008-228522 A) describes technology that cools a rotor by discharging oil supplied from an oil supply passage formed inside of a rotating shaft, through a plurality of cooling oil passages formed inside of a rotor core. In JP 2008-228522 A, for example, a cooling oil passage that extends on a q-axis of the rotary electric machine is formed by forming slots that extend on the q-axis, offset by a span in the radial direction, in each of a plurality of magnetic steel sheets that are lined up sequentially in the axial direction.

Also, Japanese Patent Application Publication No. 2006-067777 (JP 2006-067777 A) describes technology that cools a rotor by discharging oil supplied from an oil supply passage formed inside of a rotating shaft, through a plurality of cooling oil passages formed inside of a rotor core. In JP 2006-067777 A, the cooling oil passages extend on a d-axis of a rotary electric machine. In JP 2006-067777 A, a plurality of oil passages that extend in the radial direction are lined up in the axial direction.

Japanese Patent Application Publication No. 2012-223075 (JP 2012-223075 A) describes technology in which a through-hole that extends in an axial direction is formed in a rotor core, and cooling oil is supplied from one end to the other end of the through-hole. In JP 2012-223075 A, the through-hole is formed such that a distance between the through-hole and an outer peripheral surface of the rotor core is smaller on the other end side (a downstream side of an oil flow path) than on the one end (the upstream side of the oil flow path).

However, with the technology described in JP 2008-228522 A, there is no oil passage that extends in the axial direction, so cooling tends to be uneven in the axial direction, and consequently, the rotor is unable to be efficiently cooled. In JP 2006-067777 A, a plurality of oil passages that extend in the radial direction are lined up in the axial direction, so unevenness in cooling is able to be improved somewhat compared to JP 2008-228522 A. However, in JP 2006-067777 A as well, there is no oil passage that extends in the axial direction, so unevenness in cooling in the axial direction is unable to be effectively reduced. Also, in JP 2006-067777 A, oil is discharged from a plurality of discharge ports lined up in the axial direction into a gap that is a space between the rotor and the stator. Here, the oil discharged into the gap is discharged outside from both axial ends (i.e., both ends in the axial direction) of the gap. However, in JP 2006-067777 A, oil discharged from one of the discharge ports tends to interfere with oil discharged from a discharge port in a different axial position as it proceeds to the axial end portion of the gap. In this case, the cooling medium stays in the gap for an extended period of time without reaching the axial end portion of the gap. This accumulation of oil leads to an increase in drag loss.

With the technology described in JP 2012-223075 A, oil flows through the though-hole that extends in the axial direction, so the rotor is able to be cooled all along in the axial direction. However, in JP 2012-223075 A, oil is discharged from both axial ends of the rotor toward the coil end of the stator. In other words, in JP 2012-223075 A, oil is not supplied into the gap. As a result, even though the coil of the stator is able to be cooled, the outer peripheral surface of the rotor may not be able to be sufficiently cooled. That is, no related structure is able to efficiently cool the entire rotor.

SUMMARY OF THE INVENTION

The invention thus provides a rotor of a rotary electric machine in which the entire rotor is able to be efficiently cooled.

A rotor of a rotary electric machine according to one aspect of the invention is a rotor of a rotary electric machine, which is supported by a rotating shaft, that includes a rotor core, and a permanent magnet embedded in the rotor core. At least one in-core cooling medium passage that leads a cooling medium supplied from an in-shaft cooling medium passage formed inside the rotating shaft to an outer peripheral end of the rotor core, and discharges the supplied cooling medium into a gap between the rotor core and a stator, is formed in the rotor core. The at least one in-core cooling medium passage includes a center cooling medium passage that extends in an axial direction in a position farther toward an inner peripheral side than the permanent magnet, a pair of inner peripheral side cooling medium passages that are provided near both ends in the axial direction of the rotor core and that communicate the in-shaft cooling medium passage with the center cooling medium passage, and an outer peripheral side cooling medium passage that extends radially outward from a center in the axial direction of the center cooling medium passage and is communicated with the gap. A radially outside end portion of the center cooling medium passage has a slope that extends toward a radially outer side closer to the center in the axial direction.

In this aspect, the center cooling medium passage and the outer peripheral side cooling medium passage may be formed on a q-axis of the rotary electric machine, and the inner peripheral side cooling medium passage may include a first cooling medium passage that extends from an inner peripheral end of the rotor in a position offset in a circumferential direction from the q-axis of the rotary electric machine, and a second cooling medium passage that extends in the circumferential direction to communicate the first cooling medium passage with the center cooling medium passage. In this case, an axial position of the first cooling medium passage and an axial position of the second cooling medium passage may be different from each other.

Also, in the aspect described above, a sectional area of the center cooling medium passage may be larger closer to the center in the axial direction. Further, in the aspect described above, a sectional area of the center cooling medium passage may be constant in the axial direction.

According to the invention, the center cooling medium passage that extends in the axial direction is provided, and the radially outside end portion of this center cooling medium passage has a slope that extends toward the radially outer side closer to the center in the axial direction. Therefore, the flowrate of the cooling medium that flows along the radially outside end portion increases, so the entire rotor core is able to be efficiently cooled. Also, the cooling medium is discharged into the gap from the outer peripheral side cooling medium passage that extends at the center in the axial direction of the rotor, so interference of the cooling medium in the gap is prevented, and the outer peripheral surface of the rotor core and the inner peripheral surface of the stator are able to be efficiently cooled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view illustrating the flow of a cooling medium;

DETAILED DESCRIPTION OF EMBODIMENTS

Figure 1:
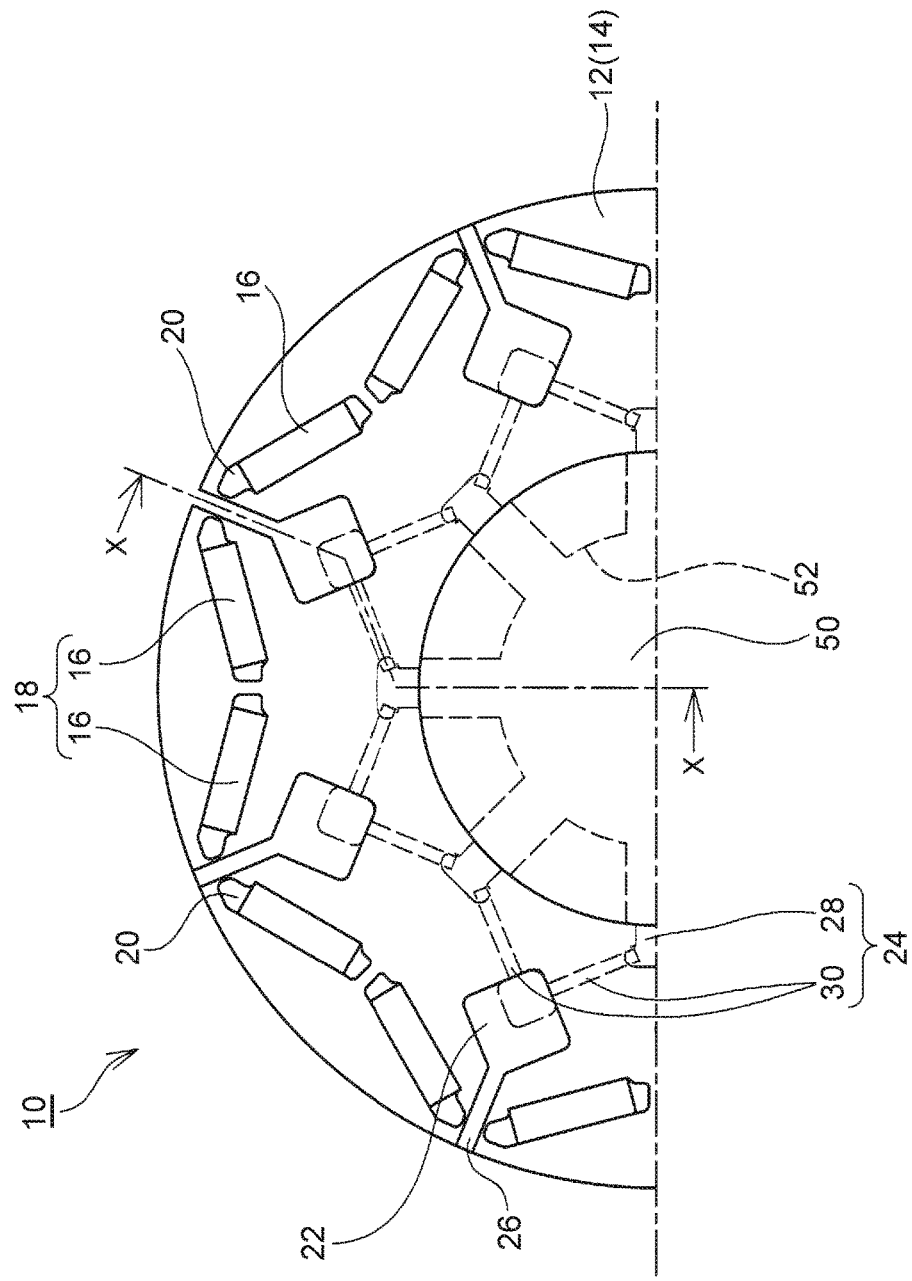
FIG. 1 is a transverse sectional view of a rotor of a rotary electric machine according to an example embodiment of the invention.
Figure 2:
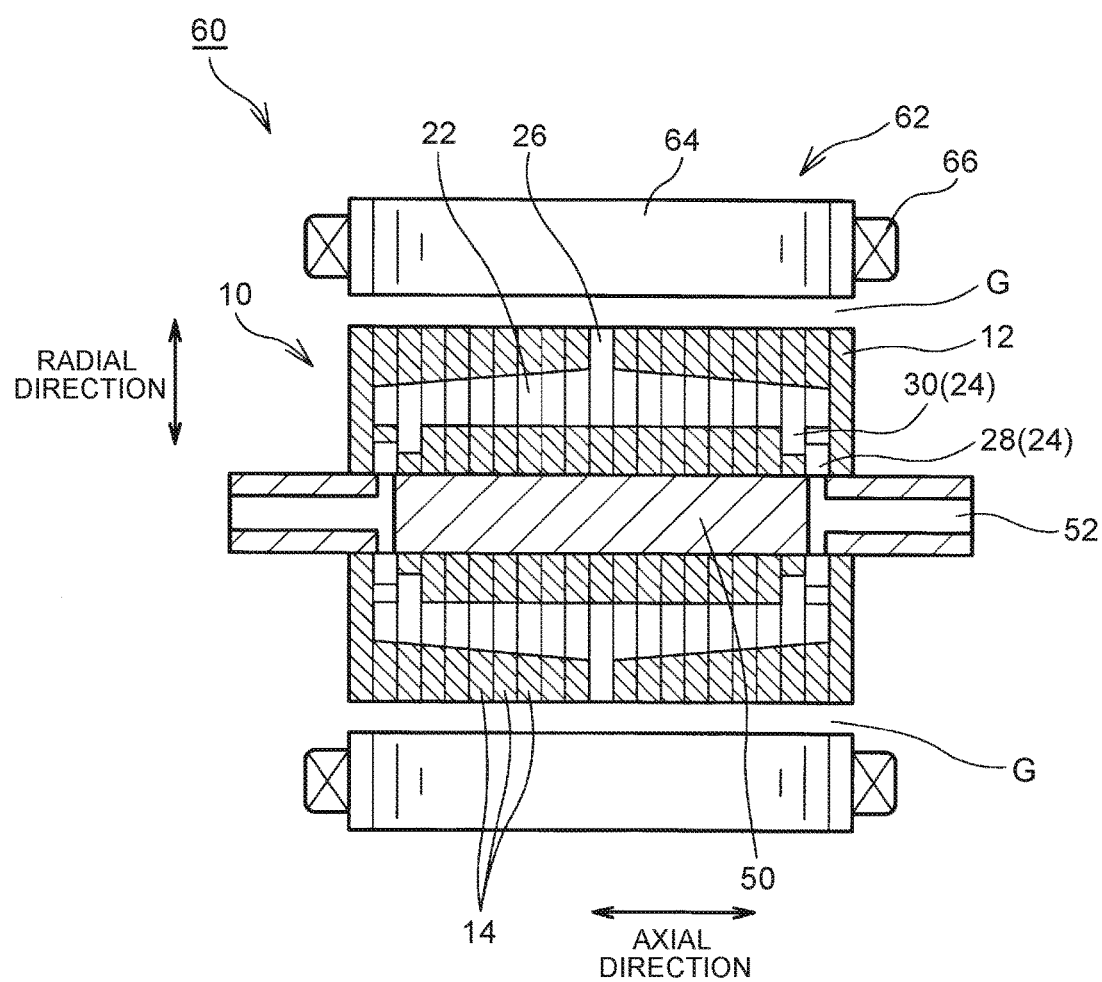
FIG. 2 is a sectional view taken along line X-X in FIG. 1.

Hereinafter, example embodiments of the invention will be described with reference to the accompanying drawings. FIG. 1 is a transverse sectional view of a rotor 10 used in a rotary electric machine 60 according to one example embodiment of the invention. Also, FIG. 2 is a sectional view of the rotary electric machine 60 taken along line X-X in FIG. 1. Further, FIG. 3 is a view illustrating the flow of a cooling medium. However, to facilitate understanding of the invention, the length in the radial direction in FIGS. 2 and 3 is shown not the same as it is in FIG. 1, but rather slightly exaggerated. Also, the thickness and the like of each magnetic steel sheet 14 also differs from the actual thickness and the like.

The rotary electric machine 60 of this example embodiment is a permanent magnet synchronous rotary electric machine in which permanent magnets 16 are embedded in a rotor core 12. This rotary electric machine 60 includes the rotor 10 and a stator 62. The stator 62 is made up of a generally annular stator core 64 having a plurality of teeth formed on an inner periphery thereof, and a stator coil 66 that is wound around the teeth. The rotor 10 is arranged concentric with the stator 62, inside of this stator 62. There is a gap G of a substantially uniform distance between an outer peripheral surface of the rotor 10 and an inner peripheral surface of the stator 62.

The rotor 10 includes the rotor core 12 and the permanent magnets 16 that are embedded in the rotor core 12. A rotating shaft 50 passes through the center of the rotor core 12, and this rotating shaft 50 is rotatably supported with respect to a case, not shown, via a bearing, also not shown, and the like. The rotor 10 is able to rotate together with this rotating shaft 50.

The rotor core 12 is formed by a plurality of magnetic steel sheets 14 that are stacked together in an axial direction. Each magnetic steel sheet 14 has a discoid shape, and is a silicon magnetic steel sheet or the like, for example. A plurality of magnet holes 20 for embedding the permanent magnets 16 are formed near an outer periphery of the rotor core 12. The plurality of magnet holes 20 are lined up evenly in a circumferential direction of the rotor core 12, and the magnet holes 20 pass through the rotor core 12 in a rotor axial direction (i.e., a direction perpendicular to the paper on which FIG. 1 is drawn).

The permanent magnets 16 that form magnetic poles 18 are embedded in the magnet holes 20. One magnetic pole 18 is formed by two permanent magnets 16. The two permanent magnets 16 that form one magnetic pole 18 are arranged in positions such that they spread out in a general V-shape toward the outer peripheral side of the rotor core 12. In this example embodiment, 16 permanent magnets 16 and eight magnetic poles 18 are arranged near an outer peripheral end of the rotor core 12. Each permanent magnet 16 has a plate shape that has a flat rectangular-shaped cross section, and an axial length substantially the same as that of the rotor core 12. The numbers of permanent magnets 16 and magnetic pole 18 described here are only examples and may be changed as appropriate. Also, in this example embodiment, one magnetic pole 18 is formed by a pair of permanent magnets 16, but one magnetic pole 18 may also be formed by just one permanent magnet 16 or by a larger number of permanent magnets 16.

A cooling medium passage through which a cooling medium for cooling the rotor 10 and the stator 62 passes is formed in the rotating shaft 50 and the rotor core 12. The cooling medium passage is broadly divided into an in-shaft cooling medium passage 52 formed inside the rotating shaft 50, and an in-core cooling medium passage formed inside the rotor core 12. The in-shaft cooling medium passage 52 is a hole that passes through the axial center of the rotating shaft 50. This in-shaft cooling medium passage 52 first extends in the axial direction from an end portion of the rotating shaft 50, and then branches off in the radial direction and extends to an inner peripheral end of the rotor core 12. As shown in FIG. 2, in this example embodiment, the in-shaft cooling medium passage 52 extends from both ends of the rotating shaft 50, and is thus able to supply the cooling medium to both axial ends in the rotor core 12.

The in-core cooling medium passage is a cooling medium passage that leads the cooling medium supplied from the in-shaft cooling medium passage 52 to the outer peripheral end of the rotor core 12, and discharges this cooling medium into the gap G, as will be described in detail later. The cooling medium is supplied from a cooling medium supply source provided outside the rotary electric machine 60 to the in-shaft cooling medium passage 52 by a pump or the like. The cooling medium supplied to the in-shaft cooling medium passage 52 then passes through the in-core cooling medium passage and is discharged from the outer peripheral end of the rotor core 12 into the gap G. This discharged cooling medium advances into the gap G and then falls down into a case bottom portion of the rotary electric machine 60. The cooling medium that has fallen down into the bottom portion of the case is suitably collected and cooled, after which it is returned to the cooling medium supply source. The cooling medium is not particularly limited as long as it is a liquid capable of displaying suitable cooling performance for the rotor 10 and the stator 62, but in this example embodiment, cooling oil is used as the cooling medium.

As is evident from the description above, in this example embodiment, the cooling medium passes sequentially from inside of the rotating shaft 50, through the inside of the rotor core 12, and then through the gap G. In this process (as the cooling medium flows through these), heat is removed from the rotor core 12, the permanent magnets 16, and the stator core 64 in attempt to cool them. In this example embodiment, the in-core cooling medium passage has a special structure in order to both improve this cooling efficiency, and prevent the output performance of the rotary electric machine 60 from deteriorating. This structure will now be described in detail.

The in-core cooling medium passage is broadly divided into a center cooling medium passage 22, an inner peripheral side cooling medium passage 24, and an outer peripheral side cooling medium passage 26. The center cooling medium passage 22 is a cooling medium passage that extends in the axial direction from near one end of the rotor core 12 to near the other end of the rotor core 12. The center cooling medium passage 22 is provided in a position farther toward the inner peripheral side than the permanent magnets 16, and on a q-axis of the rotary electric machine 60. The q-axis is an axis that passes through the center of the rotor 10 and a center position between adjacent magnetic poles 18 (a center position of a salient pole), as is well-known. Also, a d-axis is an axis that passes through the center of the rotor 10 and the center position of one magnetic pole 18. The center cooling medium passage 22 in this example embodiment is provided on each q-axis, and the number of center cooling medium passages 22 is the same as the number of magnetic poles 18.

A radially outside end portion of the center cooling medium passage 22 has a slope that extends toward the radially outer side closer to the substantial center in the axial direction. On the other hand, the radially inside end portion of the center cooling medium passage 22 extends in a direction parallel to the axial direction. As a result, the sectional area of the center cooling medium passage 22 increases closer to the axial center. This kind of change in the sectional area of the center cooling medium passage 22 (i.e., the inclination of the radially outside end portion) is able to be realized by changing the size of a center hole 22a (see FIG. 4) that forms the center cooling medium passage 22 formed in the magnetic steel sheet 14, for each magnetic steel sheet 14. In FIG. 1, the shape of the center cooling medium passage 22 in the substantial center in the axial direction is indicated by a solid line, and the shape of the center cooling medium passage 22 near the axial end portion is indicated by a broken line. In this example embodiment, the center hole 22a that forms the center cooling medium passage 22 is not provided in the magnetic steel sheets 14 arranged on both ends of the rotor core 12 in the axial direction (hereinafter, simply referred to as "both axial ends of the rotor core 12") in order to close off both axial ends of the center cooling medium passage 22. However, the center hole 22a that forms the center cooling medium passage 22 may also be provided in the magnetic steel sheets 14 at both axial ends as long as end plates or the like are provided separately on both axial ends of the rotor core 12.

The inner peripheral side cooling medium passage 24 is a cooling medium passage that communicates the in-shaft cooling medium passage 52 with the center cooling medium passage 22. This inner peripheral side cooling medium passage 24 is provided near both axial ends of the rotor core 12. Each inner peripheral side cooling medium passage 24 includes a first cooling medium passage 28 that extends from the inner peripheral end of the rotor core 12, and a second cooling medium passage 30 that communicates the first cooling medium passage 28 with the center cooling medium passage 22. The first cooling medium passage 28 is a flow path that extends on the d-axis. One end of the first cooling medium passage 28 is connected to the in-shaft cooling medium passage 52, and the other end of the first cooling medium passage 28 stops at a position farther to the inner peripheral side than the permanent magnets 16. The other end of the first cooling medium passage 28 spreads out in a generally elliptical shape in order to facilitate communication with the second cooling medium passage 30. The first cooling medium passage 28 is provided on each d-axis. The number of first cooling medium passages 28 of one inner peripheral side cooling medium passage 24 is the same as the number of magnetic poles 18.

The second cooling medium passage 30 is a flow path that extends in substantially the circumferential direction, in a position farther toward the inner peripheral side than the permanent magnets 16. One end of the second cooling medium passage 30 is in a position overlapping with the other end of the first cooling medium passage 28. Therefore, as shown in FIG. 2, the second cooling medium passage 30 and the first cooling medium passage 28 are communicated together by stacking the magnetic steel sheet 14 in which the second cooling medium passage 30 is formed, adjacent to the magnetic steel sheet 14 in which the first cooling medium passage 28 is formed. The other end of the second cooling medium passage 30 is connected to the center cooling medium passage 22, as shown in FIG. 1. In this example embodiment, two second cooling medium passages 30 that extend in opposite directions in substantially the circumferential direction are connected to one first cooling medium passage 28. Also, two second cooling medium passages 30 that extend from different first cooling medium passages 28 are connected to one center cooling medium passage 22. Therefore, the number of second cooling medium passages 30 of one inner peripheral side cooling medium passage 24 is twice the number of first cooling medium passages 28, and twice the number of magnetic poles 18.

The outer peripheral side cooling medium passage 26 is a cooling medium passage that extends from substantially the axial center of the center cooling medium passage 22 to the radially outer side and is communicated with the gap G. The outer peripheral side cooling medium passage 26 extends in the radial direction from the outer peripheral end of the rotor core 12 and is connected to the center cooling medium passage 22. Here, as is evident from FIG. 2, the outer peripheral side cooling medium passage 26 is provided only in substantially the axial center of the rotor core 12. In other words, the cooling medium discharge port (i.e., the outer peripheral end of the outer peripheral side cooling medium passage 26) is provided only in the axial center of the rotor core 12. Also, the outer peripheral side cooling medium passage 26 is provided on each q-axis, and the number of outer peripheral side cooling medium passages 26 is the same as the number of magnetic poles 18.

This kind of in-core cooling medium passage is formed by suitably forming a slot or hole in the magnetic steel sheets 14 that form the rotor core 12. Also, the magnetic steel sheets 14 that form the rotor core 12 have different shapes according to the position in which they are stacked in the axial direction. This will be described with reference to FIGS. 4A to 4C.

There are broadly five types of magnetic steel sheets 14 that form the rotor core 12. The first is a magnetic steel sheet 14 in which only a plurality of magnet holes 20 are formed. This magnetic steel sheet 14 is arranged at both axial ends of the rotor core 12.

Figure 4A:
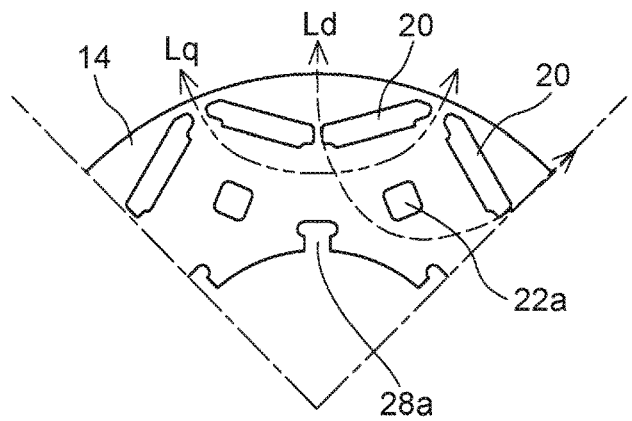
FIG. 4A is a view of an example of a magnetic steel sheet.

The second is a magnetic steel sheet 14 that has a first slot 28a and a center hole 22a, in addition to the plurality of magnet holes 20, as shown in FIG. 4A. This magnetic steel sheet 14 is arranged near both axial ends of the rotor core 12. The first slot 28a is a slot that extends from the inner peripheral side end portion toward the radial outside along the d-axis, and forms the first cooling medium passage 28. The center hole 22a is a through-hole that is arranged farther toward the inner peripheral side than the magnet holes 20, and on the q-axis. This center hole 22a forms the center cooling medium passage 22.

Figure 4B:
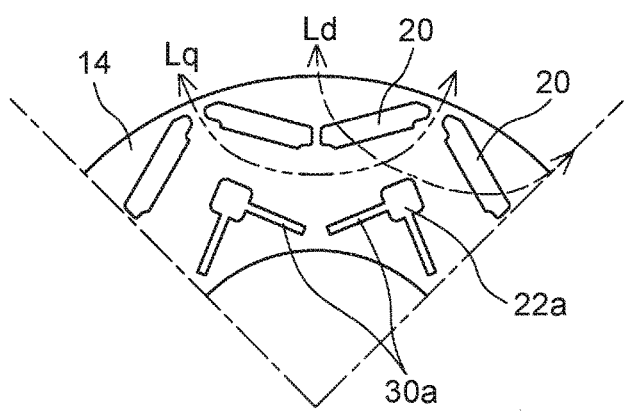
FIG. 4B is a view of an example of another magnetic steel sheet.

The third is a magnetic steel sheet 14 that has a second slot 30a and the center hole 22a, in addition to the plurality of magnet holes 20, as shown in FIG. 4B. This magnetic steel sheet 14 is arranged adjacent to the magnetic steel sheet 14 in FIG. 4A. The second slot 30a is a slot that extends in substantially the circumferential direction, in a position farther toward the inner peripheral side than the magnet holes 20, and forms the second cooling medium passage 30. The center hole 22a is connected to this second slot 30a. In order to give the radially outside end portion of the center cooling medium passage 22 a slope, the center hole 22a that is formed in the magnetic steel sheet 14 in FIG. 4B is slightly larger than the center hole 22a that is formed in the magnetic steel sheet 14 in FIG. 4A.

The fourth is a magnetic steel sheet 14 that has the plurality of magnet holes 20 and the center hole 22a. These magnetic steel sheets 14 are arranged between the magnetic steel sheet 14 in FIG. 4B and the magnetic steel sheet 14 in FIG. 4C. However, the size of the center hole 22a formed in these magnetic steel sheets 14 is not constant. The center hole 22a is larger in magnetic steel sheets 14 that are arranged closer to the axial center.

Figure 4C:
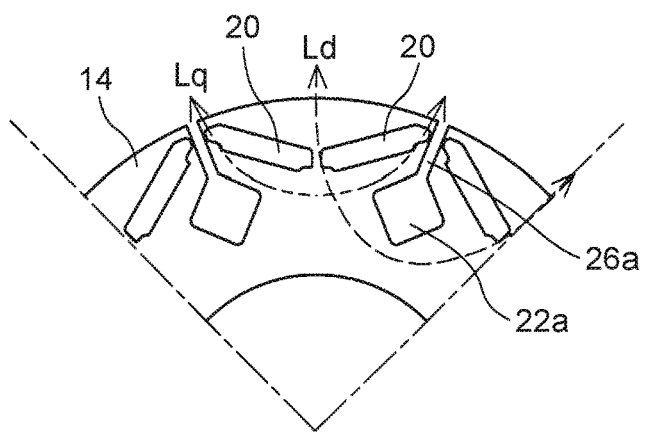
FIG. 4C is a view of an example of yet another magnetic steel sheet.

The fifth is a magnetic steel sheet 14 that has the center hole 22a and an outer peripheral side slot 26a, in addition to the plurality of magnet holes 20. This magnetic steel sheet 14 is arranged in substantially the axial center of the rotor core 12. The outer peripheral side slot 26a is a slot that extends toward the radial inside from the outer peripheral side end portion along the q-axis, and forms the outer peripheral side cooling medium passage 26. The center hole 22a is connected to this outer peripheral side slot 26a. Also, the center hole 22a formed in the magnetic steel sheet 14 in FIG. 4C is larger than the center hole 22a formed in the other magnetic steel sheets 14. The rotor core 12 in which the in-core cooling medium passage is formed is able to be formed by stacking these plurality of types of magnetic steel sheets 14 together.

Figure 7A:
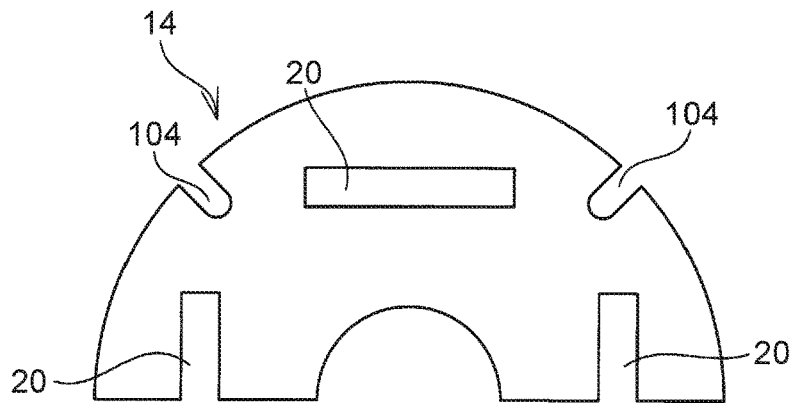
FIG. 7A is a view of a magnetic steel sheet used in a rotor according to related art.
Figure 7B:
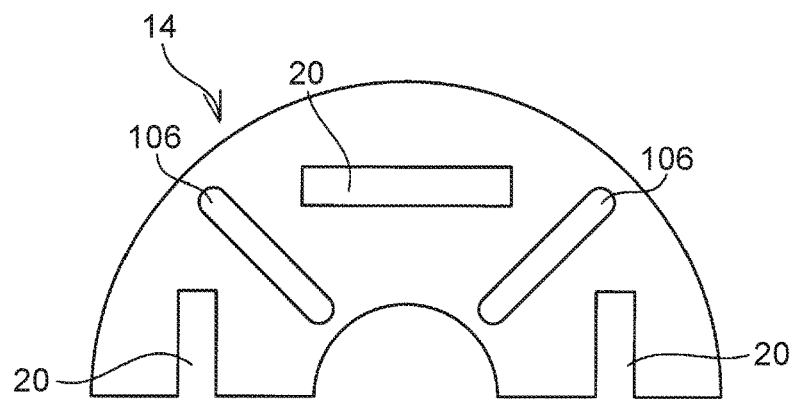
FIG. 7B is a view of another magnetic steel sheet used in the rotor according to the related art.
Figure 7C:
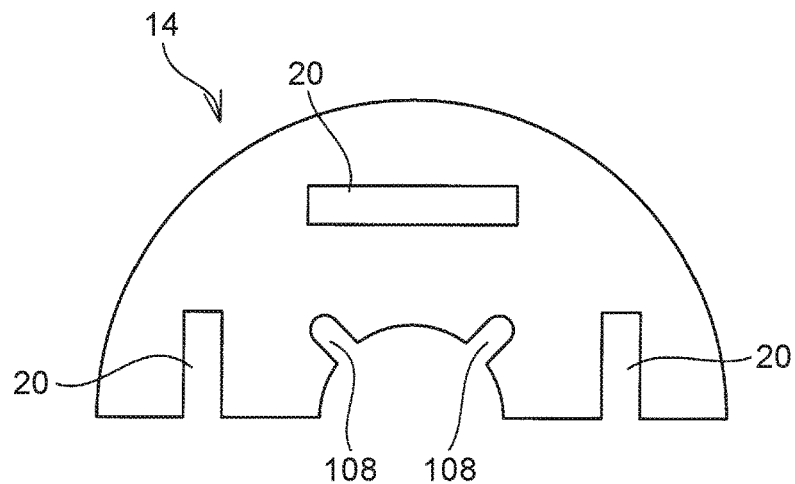
FIG. 7C is a view of yet another magnetic steel sheet used in the rotor according to the related art.
Figure 8:
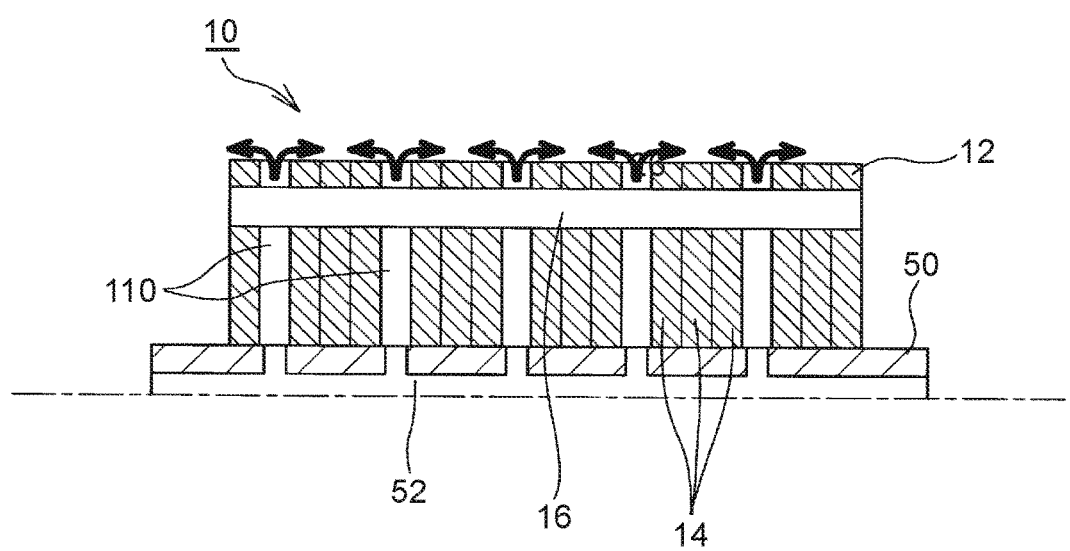
FIG. 8 is a view of the structure of the rotor according to related art.

Next, the cooling performance of this rotor 10 when the rotor 10 is used will be described compared to the related art. In the related art as well, technology to cool the rotor 10 and the stator 62 by forming a cooling medium flow path inside the rotor core 12 has been proposed. For example, JP 2008-228522 A describes technology in which a cooling oil passage that extends on the q-axis is formed by forming slots 104, 106, and 108 that extend on the q-axis of a rotary electric machine, offset by a span in the radial direction, in each of a plurality of magnetic steel sheets 14 that are lined up sequentially in the axial direction, as shown in FIGS. 7A, 7B, and 7C. Also, JP 2006-067777 A describes technology in which a cooling medium passage 110 that extends on a d-axis is provided in a plurality of locations in the axial direction, as shown in FIG. 8.

According to such related art, the rotor 10 and the stator 62 are able to be cooled because the cooling medium is able to be discharged into the gap G from within the rotor core 12. However, with the technology in JP 2008-228522 A, there is no cooling medium passage that extends in the axial direction, so cooling is not able to be performed evenly all along in the axial direction, and as a result, cooling in the axial direction tends to be uneven. In particular, it is difficult to evenly cool permanent magnets that are long in the axial direction, so the cooling efficiency of the permanent magnets is poor.

With the technology described in JP 2006-067777 A in which a cooling medium passage is provided in a plurality of locations in the axial direction, such a problem is improved somewhat. However, even with the technology described in JP 2006-067777 A, there is no cooling medium passage that extends in the axial direction, so it is difficult to cool the permanent magnets 16 evenly. Also, with the technology described in JP 2006-067777 A, multiple cooling medium discharge ports are lined up in the axial direction in the outer peripheral surface of the rotor core 12. In this case, as shown by the arrows in FIG. 8, as the cooling medium discharged from one discharge port into the gap G moves toward both ends of the gap G, it interferes with the cooling medium discharged from another discharge port. As a result, the cooling medium may not be quickly discharged from the gap G, but instead accumulate in the gap G, which may lead to an increase in drag loss.

Furthermore, with the technology described in JP 2008-228522 A, the cooling medium passage extends on the q-axis, and with the technology described in JP 2006-067777 A, the cooling medium passage extends on the d-axis. In this case, one of magnet torque and reluctance torque may decrease. That is, as is well known, an IPM rotary electric machine improves output performance by effectively utilizing both the reluctance torque and the magnet torque by the permanent magnets 16. In order to effectively utilize the magnet torque, the magnetic resistance in a magnetic path of interlinkage magnetic flux by a d-axis current (hereinafter, referred to as the "d-axis magnetic path") must be reduced. Also, in order to effectively utilize the reluctance torque, the magnetic resistance in a magnetic path of interlinkage magnetic flux by a q-axis current (hereinafter, referred to as the "q-axis magnetic path") must be reduced.

Here, the d-axis magnetic path Ld is a magnetic path that cuts across the q-axis of the rotary electric machine 60, as shown by the broken line in FIG. 4. Therefore, if the slots 104, 106, and 108 for forming the cooling medium passage are formed on the q-axis as they are in JP 2008-228522 A, the slots 104, 106, and 108 where magnetic resistance is high will be positioned in the middle of the d-axis magnetic path Ld. In this case, the magnetic resistance of the d-axis magnetic path Ld increases significantly, which will lead to a decrease in magnet torque. Also, the q-axis magnetic path Lq is a magnetic path that cuts across the d-axis of the rotary electric machine 60, as shown by the alternate long and two short dashes line in FIG. 4. Therefore, if the slots for forming the cooling medium passage are formed on the d-axis as they are in JP 2006-067777 A, these slots where magnetic resistance is high will be positioned in the middle of the q-axis magnetic path Lq, so the magnetic resistance of the q-axis magnetic path Lq will increase significantly, which will lead to a decrease in reluctance torque.

On the other hand, in this example embodiment, the center cooling medium passage 22 that extends in the axial direction is provided. Therefore, as shown by the bold lines in FIG. 3, the cooling medium is able to flow along in the axial direction of the rotor core 12. As a result, with this example embodiment, the rotor core 12 and the permanent magnets 16 are able to be cooled substantially evenly in the axial direction. Also, in this example embodiment, the radially outside end portion of this center cooling medium passage 22 is inclined such that the radially outside end portion of this center cooling medium passage 22 extends toward the radially outer side closer to the substantial center in the axial direction. This inclination makes it possible to improve the flow rate of cooling medium that moves toward the outer peripheral side cooling medium passage 26 (the substantial center in the axial direction), thereby enabling the cooling performance to be further improved. That is, when the rotor 10 rotates at a high speed, centrifugal force, i.e., force toward the radially outer side, is generated. The cooling medium supplied to the center cooling medium passage 22 moves toward the radially outside end portion in response to this centrifugal force. Then, the cooling medium that has reached the radially outside end portion moves farther in the direction toward the radially outer side, i.e., toward the center substantial in the radial direction, along the radially outside end portion. Also, this centrifugal force is greater at positions where the radius (i.e., the distance from the rotational center) is larger, that is, the centrifugal force increases as the radius increases. Because the distance between the radially outside end portion of the center cooling medium passage 22 and the rotational center is greater closer to the axial center, the centrifugal force generated at the radially outside end portion is greater closer to the substantial center in the axial direction. That is, there is a difference in centrifugal force at the radially outside end portion of the center cooling medium passage 22 in this example embodiment. Because of this difference in centrifugal force, cooling medium supplied to the center cooling medium passage 22 tends to move more easily in the direction where the centrifugal force is greater, i.e., toward the substantial center in the axial direction. As a result, the flow rate of the cooling medium toward the outer peripheral side cooling medium passage 26 (i.e., the substantial center in the axial direction) is able to be improved, so cooling efficiency is able to be further improved.

Also, in this example embodiment, the cooling medium that has passed through the center cooling medium passage 22 is discharged into the gap G from the outer peripheral side cooling medium passage 26. The outer peripheral side cooling medium passage 26 is provided only at the substantial center in the axial direction. Therefore, the cooling medium discharge port is only at the substantial center in the axial direction. As a result, the cooling medium discharged from the substantial center in the axial direction will not interfere with the cooling medium discharged from other discharge ports as it proceeds to both axial ends of the gap G, and is thus quickly discharged out of the gap G, just as shown in FIG. 3. As a result, drag loss caused by the accumulation of cooling medium is able to be effectively prevented.

Also, according to this example embodiment, the cooling medium runs through both the center cooling medium passage 22 that is farther toward the inner peripheral side than the permanent magnets 16, and the gap G that is farther toward the outer peripheral side than the permanent magnets 16. As a result, the permanent magnets 16 are cooled from both the inner peripheral side and the outer peripheral side, so the permanent magnets 16 are able to be cooled more effectively. Consequently, demagnetization and a reduction in performance of the permanent magnets 16 due to heat are also able to be prevented.

Further, in this example embodiment, the first cooling medium passage 28, the second cooling medium passage 30, and the outer peripheral side cooling medium passage 26 are each formed in a different axial position (magnetic steel sheet 14). Therefore, according to this example embodiment, neither the d-axis magnetic path Ld nor the q-axis magnetic path Lq is divided by a cooling medium passage, so both the magnet torque and the reluctance torque are able to be effectively utilized, and consequently, a decrease in output performance of the rotary electric machine 60 is able to be prevented.

That is, as shown by the broken line in FIGS. 4A to 4C, the d-axis magnetic path Ld first extends inside the rotor core 12, passing through the center of one magnetic pole 18, then cuts across the q-axis, and passes through the center of another magnetic pole 18 that is adjacent before exiting the rotor core 12. Also, as shown by the alternate long and two short dashes line in FIGS. 4A to 4C, the q-axis magnetic path Lq first extends inside the rotor core 12 from a salient pole formed between the magnetic poles 18, then cuts across the d-axis magnetic path Ld, and passes through another salient pole that is adjacent before exiting the rotor core 12. If there are slots or the like midway in the paths of the d-axis magnetic path Ld and the q-axis magnetic path Lq, the magnet torque and the reluctance torque will decrease.

In this example embodiment, the second cooling medium passage 30 that extends in the circumferential direction and the outer peripheral side cooling medium passage 26 that extends on the q-axis are formed in different magnetic steel sheets 14, and the first cooling medium passage 28 only extends halfway in the radial direction of the magnetic steel sheet 14, so as not to obstruct the d-axis magnetic path Ld. Therefore, the d-axis magnetic path Ld is not divided by a cooling medium passage, so the magnetic resistance of the d-axis magnetic path Ld is able to be kept low. Also, in this example embodiment, the outer peripheral side cooling medium passage 26 that extends on the q-axis only extends to a position farther to the inner peripheral side than the permanent magnets 16, so as not to obstruct the q-axis magnetic path Lq. Therefore, the q-axis magnetic path Lq is also not divided by a cooling medium passage, so the magnetic resistance is able to be kept small.

The structure described thus far is only an example. As long as the in-core cooling medium passage has the center cooling medium passage 22 that extends in the axial direction, the inner peripheral side cooling medium passage 24 that communicates the in-shaft cooling medium passage 52 with the center cooling medium passage 22, and the outer peripheral side cooling medium passage 26 that communicates the center cooling medium passage 22 with the gap G at the substantial center in the axial direction, and the radially outside end portion of the center cooling medium passage 22 has a slope that extends toward the radially outer side closer to the substantial center in the axial direction, the other structure may be modified.

Figure 6:
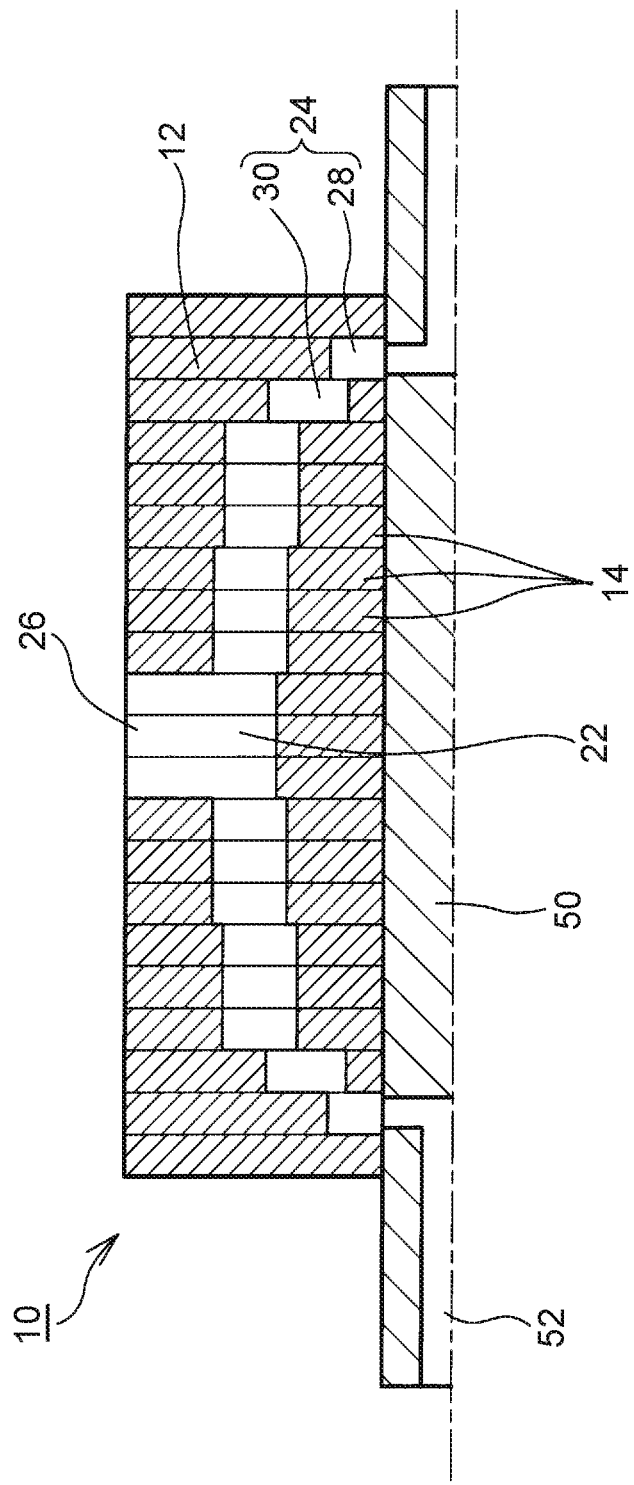
FIG. 6 is a view of the structure of still another rotor.

For example, the slope of the radially outside end portion of the center cooling medium passage 22 may be achieved by a smooth inclination such as that shown in FIGS. 2 and 3, or it may be achieved by steps, as shown in FIG. 6. With this structure, the position and shape of the center hole 22a formed in a plurality of (three in the example shown in the drawings) magnetic steel sheets 14 between one step and the next step are the same. As a result, the number of types of magnetic steel sheets 14 is able to be reduced.

Figure 5:
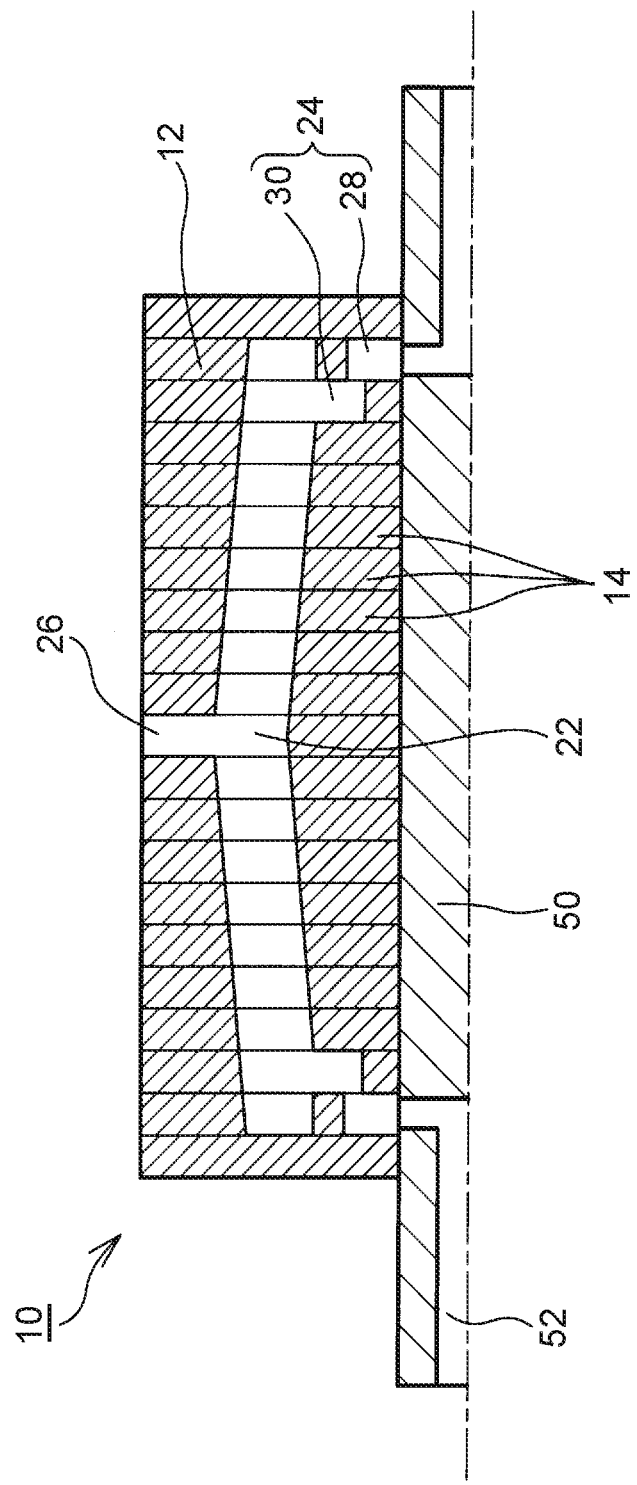
FIG. 5 is a view of structure of another rotor.

Also, in this example embodiment, only the radially outside end portion of the center cooling medium passage 22 is sloped, but the radially inside end portion of the center cooling medium passage 22 may also be sloped, as shown in FIGS. 5 and 6. In this case, the sectional area of the center hole 22a is the same regardless of the axial position. In other words, even near the axial center, the center hole 22a is able to be kept small, so a decrease in strength caused by the center hole 22a is able to be reduced. However, as long as the strength of the rotor core 12 is able to be ensured, the center hole 22a is preferably larger closer to the axial center, as shown in FIGS. 2 and 3. This is because the larger the center hole 22a is, the greater the contact area between the cooling medium and the rotor core 12 is, so the cooling efficiency improves. The axial center is positioned on the downstream side, with respect to the flow of cooling medium, of the axial end portion, and is a position where cooling medium of a relatively elevated temperature flows. At the axial center, the center hole 22a is preferably large to increase the contact area between the rotor core 12 and the cooling medium.

The slope and size of this center cooling medium passage 22 may be changed appropriately according to the required cooling capacity, and the size of the rotor core 12 and the like. For example, the cooling efficiency increases the higher the flowrate of the cooling medium is. If the flowrate of the cooling medium is to be increased, a larger slope is preferable. On the other hand, if the slope is large, the distance between the permanent magnets 16 and the center cooling medium passage 22 near both axial ends will be greater, so the cooling efficiency of the permanent magnets 16 at both axial ends will decrease. The slope of the center cooling medium passage 22 may be determined according to the required flowrate of the cooling medium, and the distance between the center cooling medium passage 22 and the permanent magnets 16 and the like. Also, the larger the sectional area of the center cooling medium passage 22 is, the greater the contact area between the cooling medium and the rotor core 12 is, so the cooling efficiency increases. However, if the sectional area of the center cooling medium passage 22 is too large, the strength of the rotor core 12 will decrease, and the d-axis magnetic path Ld and the q-axis magnetic path Lq will become narrow. Therefore, the sectional area of the center cooling medium passage 22 is preferably determined taking this into account.

Also, in this example embodiment, the second slot 30a and the center hole 22a are formed in the same magnetic steel sheet 14, as shown in FIG. 4B. However, the center cooling medium passage 22 may also extend from the magnetic steel sheet 14 that is adjacent to the magnetic steel sheet 14 in which the second slot 30a is formed, and the second slot 30a and the center hole 22a may each be formed in different magnetic steel sheets 14, as shown in FIG. 6. In this case, the d-axis magnetic path Ld is able to be wider than it is in FIG. 4B.

Also, in this example embodiment, the first cooling medium passage 28, the second cooling medium passage 30, and the outer peripheral side cooling medium passage 26 are formed by slots that pass through the magnetic steel sheets 14, but these cooling medium passages may also be formed by grooves that do not pass through the magnetic steel sheets 14, instead of by slots. Also, the first cooling medium passage 28, the second cooling medium passage 30, and the outer peripheral side cooling medium passage 26 may also be formed by a plurality of the magnetic steel sheets 14, instead of one magnetic steel sheet 14. For example, three of the magnetic steel sheets 14 in which the outer peripheral side slot 26a is formed may be stacked together, as shown in FIG. 6. In this case, the thickness (i.e., the axial distance) of the outer peripheral side cooling medium passage 26 corresponds to the thickness of the three magnetic steel sheets 14, so the sectional area of the outer peripheral side cooling medium passage 26 is able to be increased. Also, in this example embodiment, only the rotor core 12 that is formed by laminated steel sheet in which the magnetic steel sheets 14 are laminated together is illustrated. However, as long as the strength characteristics and the magnetic properties, for example, are maintained, the rotor core 12 may also be formed from something other than laminated steel sheet, such as a powder magnetic core or the like, for example.

Moreover, in this example embodiment, the first cooling medium passage 28 is arranged on the d-axis, but as long as the first cooling medium passage 28 is formed in a position offset from the q-axis in the circumferential direction, the first cooling medium passage 28 is not limited to being provided on the d-axis and may be provided in another location. Also, the number of each type of cooling medium passage may be changed as appropriate. For example, the center cooling medium passage 22 may also be formed at every second salient pole. With this, the number of first cooling medium passages 28, second cooling medium passages 30, and outer peripheral side cooling medium passages 26 may also be adjusted.

Also, in the description above, only the rotor 10 in which the permanent magnets 16 are arranged in V-shapes is illustrated, but as long as the rotor 10 is such that the permanent magnets 16 are embedded in the rotor core 12, the permanent magnets 16 may also be rectangular or horseshoe-shaped.

What is claimed is:

1. A rotor of a rotary electric machine, which is supported by a rotating shaft, comprising:
   a rotor core; and
   a permanent magnet embedded in the rotor core,
   wherein
   at least one in-core cooling medium passage that leads a cooling medium supplied from an in-shaft cooling medium passage formed inside the rotating shaft to an outer peripheral end of the rotor core, and discharges the supplied cooling medium into a gap between the rotor core and a stator, is formed in the rotor core;
   the at least one in-core cooling medium passage includes a center cooling medium passage that extends in an axial direction in a position farther toward an inner peripheral side than the permanent magnet, a pair of inner peripheral side cooling medium passages that are provided near both ends in the axial direction of the rotor core and that communicate the in-shaft cooling medium passage with the center cooling medium passage, and an outer peripheral side cooling medium passage that extends radially outward from a center in the axial direction of the center cooling medium passage and is communicated with the gap; and a radially outside end portion of the center cooling medium passage has a slope that extends toward a radially outer side closer to the center in the axial direction;

wherein the slope is provided by a smooth inclined surface or a plurality of step portions.

2. The rotor according to claim 1, wherein the center cooling medium passage and the outer peripheral side cooling medium passage are formed on a q-axis of the rotary electric machine; and the inner peripheral side cooling medium passage includes a first cooling medium passage that extends from an inner peripheral end of the rotor in a position offset in a circumferential direction from the q-axis of the rotary electric machine, and a second cooling medium passage that extends in the circumferential direction to communicate the first cooling medium passage with the center cooling medium passage.

3. The rotor according to claim 2, wherein an axial position of the first cooling medium passage and an axial position of the second cooling medium passage are different from each other.

4. The rotor according to claim 1, wherein a sectional area of a portion of the center cooling medium passage including the radially outside end portion having the slope is larger closer to the center in the axial direction.

5. The rotor according to claim 1, wherein a sectional area of a portion of the center cooling medium passage including the radially outside end portion having the slope is constant in the axial direction.

* * * * *